United States Patent
Teplitxky et al.

(10) Patent No.: US 7,034,689 B2
(45) Date of Patent: Apr. 25, 2006

(54) SECURE PRODUCT PACKAGING SYSTEM

(76) Inventors: Bertrand Teplitxky, 10385 Farallone Dr., Cupertino, CA (US) 95014; Lawrence G. Martinelli, 5052 Woodland Dr., Placerville, CA (US) 95667

( * ) Notice: Subject to any disclaimer, the term of this patent is extended or adjusted under 35 U.S.C. 154(b) by 116 days.

(21) Appl. No.: 10/767,120

(22) Filed: Jan. 28, 2004

(65) Prior Publication Data

US 2005/0162277 A1     Jul. 28, 2005

(51) Int. Cl.
    *G08B 13/14*     (2006.01)
(52) U.S. Cl. .................. 340/572.7; 340/572.8; 340/572.1; 343/718
(58) Field of Classification Search ............ 340/572.7, 340/572.8
See application file for complete search history.

(56) References Cited

U.S. PATENT DOCUMENTS

| | | | |
|---|---|---|---|
| 5,347,274 A * | 9/1994 | Hassett ..................... 340/988 |
| 5,532,692 A * | 7/1996 | Tatsuya .................... 340/10.1 |
| 5,541,578 A * | 7/1996 | Lussey ..................... 340/571 |
| 5,566,441 A * | 10/1996 | Marsh et al. .............. 29/600 |
| 5,608,379 A * | 3/1997 | Narlow et al. ............ 340/572.6 |
| 5,825,283 A * | 10/1998 | Camhi ...................... 340/438 |
| 5,936,523 A * | 8/1999 | West ......................... 340/545.6 |
| 5,990,791 A * | 11/1999 | Andreasen et al. ........ 340/572.1 |
| 6,050,622 A * | 4/2000 | Gustafson ................. 292/307 R |
| 6,222,452 B1 * | 4/2001 | Ahlstrom et al. ......... 340/572.1 |
| 6,421,013 B1 * | 7/2002 | Chung ..................... 343/700 MS |
| 6,572,022 B1 * | 6/2003 | Suzuki ...................... 235/492 |
| 6,724,311 B1 * | 4/2004 | Kolton et al. ............. 340/572.8 |
| 6,888,509 B1 * | 5/2005 | Atherton ................... 340/572.7 |
| 2002/0067264 A1 * | 6/2002 | Soehnlen .................. 340/572.1 |
| 2003/0235027 A1 * | 12/2003 | Smeyak et al. ........... 340/572.8 |
| 2004/0066296 A1 * | 4/2004 | Atherton ................... 340/572.8 |
| 2004/0245205 A1 * | 12/2004 | Egli et al. .................. 215/232 |
| 2005/0080566 A1 * | 4/2005 | Vock et al. ................. 702/2 |
| 2005/0146435 A1 * | 7/2005 | Girvin et al. .............. 340/572.8 |

* cited by examiner

*Primary Examiner*—Jeffery Hofsass
*Assistant Examiner*—Eric Blount
(74) *Attorney, Agent, or Firm*—Thomas E. Schatzel; Law Offices of Thomas E. Schatzel, P.C.

(57) ABSTRACT

A product security system includes an RFID chip and antenna that are polymerized onto separable parts of a commercial product package. The RFID chip includes a unique serial number that can be interrogated by a wireless reader. A database of such unique serial numbers associated with particular manufacturing production runs is used in a method to detect counterfeiting. The RFID chip and antenna are embedded such that attempts to remove or transfer them will be obvious to an inspector.

14 Claims, 3 Drawing Sheets

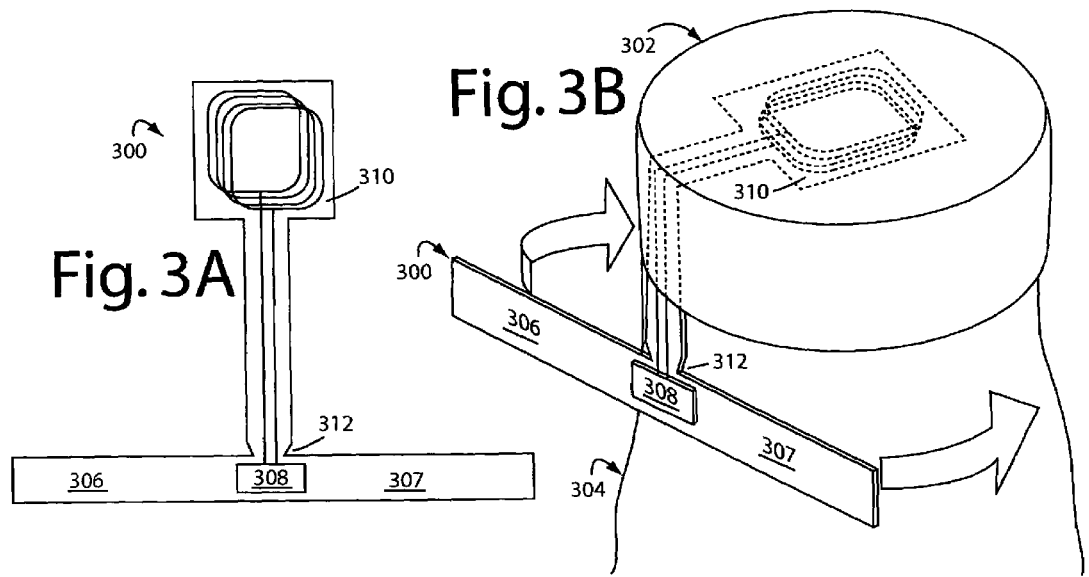
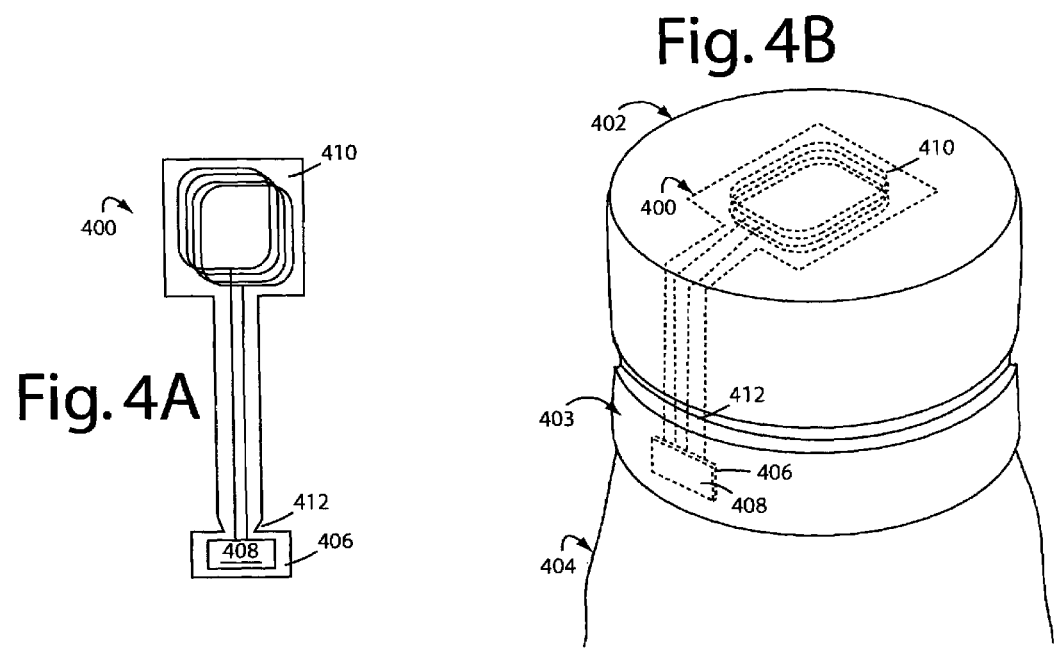

SECURE PRODUCT PACKAGING SYSTEM

BACKGROUND OF THE INVENTION

1. Field of the Invention

The present invention relates to product packaging, and in particular to secure packaging and sealing systems that combat tampering, gray marketing, and product counterfeiting.

2. Description of the Prior Art

The general public is now very familiar with product packages and seals that are used to make product tampering obvious to the consumer. These measures developed in part from past cases of food and medicine tampering that ended in a few cases of poisoning and a public panic. One case in particular, the Tylenol pain-reliever tainting with cyanide, is infamous.

Some foods spoil more quickly once the bottle or package has been entered. So many producers include devices and labels that warn a consumer if the package has been opened. For example, foods in glass jars are sealed by their tops under vacuum. When the lid is opened, the vacuum is lost and the metal lid top bubbles up and no longer down. A warning label warns consumers to look for this condition to ensure product freshness and safety.

Product counterfeiting presents a very different situation for both consumers and producers. Some products have such high price points that it makes it very affordable for a counterfeiter to exactly duplicate all the packaging, and its associated seals and security devices. For example, common prescriptions now retail for $10–20 a pill. Some cancer medicines can retail for over $10,000 for a 30-day supply for one user. Any and all safety and security measures can be duplicated and impersonated by counterfeit products that don't have to bear the development and marketing costs. Many commercial manufacturers suffer large losses to counterfeiters, and so they often are subjected to financial reserves that can approach 50% of their gross sales.

SUMMARY OF THE INVENTION

Briefly, a product security system embodiment of the present invention includes an RFID chip and antenna that are polymerized onto separable parts of a commercial product package. The RFID chip includes a unique serial number that can be interrogated by a wireless reader. A database of such unique serial numbers associated with particular manufacturing production runs is used in a method to detect counterfeiting. The RFID chip and antenna are embedded such that attempts to remove or transfer them will be obvious to an inspector.

An advantage of the present invention is that a system is provided for detecting product tampering.

Another advantage of the present invention is that a method is provided for detecting product counterfeiting.

A further advantage of the present invention is that retro-fit security system is provided for existing products.

These and other objects and advantages of the present invention will no doubt become obvious to those of ordinary skill in the art after having read the following detailed description of the preferred embodiments which are illustrated in the various drawing figures.

IN THE DRAWINGS

FIG. 3A is a plan view of a security device embodiment of the present invention for a bottle or jar with a simple cap;

FIG. 3B is a perspective view of the security device of FIG. 3A embedded in the cap of a jar and showing the tabs that are to be wrapped and permanently bonded to the body of the jar;

FIG. 4A is a plan view of a security device embodiment of the present invention for a bottle or jar with a security cap that breaks apart when twisted open by a user; and FIG. 4B is a perspective view of the security device of FIG. 4A, with its antenna embedded in the top part of a security cap of a jar, and showing the RFID chip embedded in the bottom lower ring part of the security cap.

DETAILED DESCRIPTION OF THE PREFERRED EMBODIMENT

Figure 1:
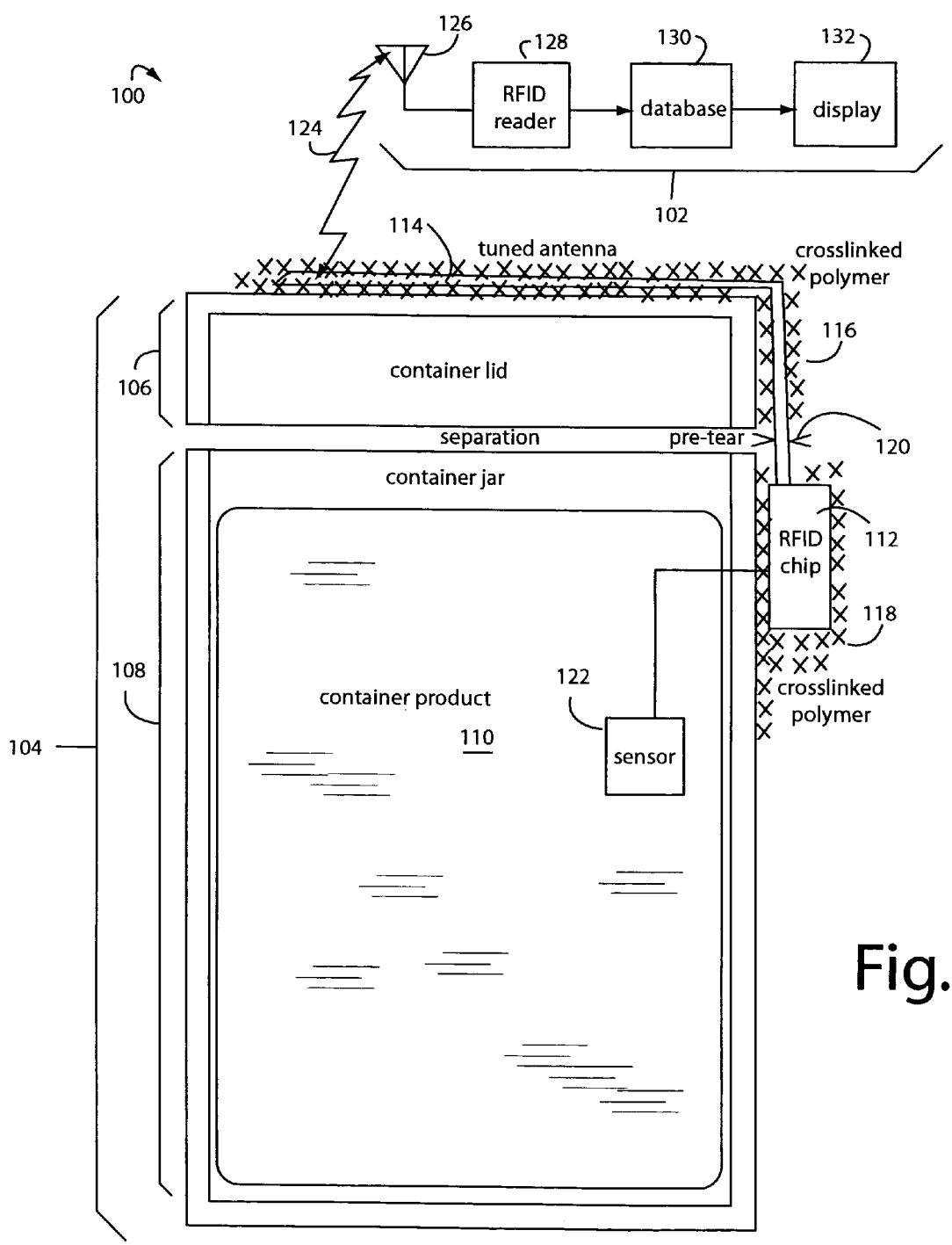
FIG. 1 is a functional block diagram of a product security system embodiment of the present invention.

FIG. 1 represents a product security system embodiment of the present invention, and is referred to herein by the general reference numeral 100. The product security system 100 comprises a portable tag reader 102 for inspecting a commercial packaged product 104. The reader 102 will assist a user in determining if there has been any tampering or counterfeiting of the product 104. A lid 106 screws onto a matching jar 108 filled with a product 110.

A radio frequency identification (RFID) chip 112 is connected to a tuned antenna 114, e.g., operating at 13.56 MHz. A thermosetting cross-linked polymer 116 "plastic-welds" the antenna to the lid 106. Similarly, another thermosetting cross-linked polymer 118 plastic-welds the RFID chip 112 to the jar 108.

A pre-tear 120 favors ripping the antenna 114 at the container separation line when the consumer opens or otherwise penetrates the packaged product 104. When the product is accessed, the antenna 114 will be damaged, and any electronic access to the RFID chip 112 will be impossible.

In alternative embodiments of the present invention, a sensor 122 is included to monitor a physical characteristic of the container product 110. For example, the sensor 122 can be configured to measure the density, composition, chemistry, pH, electrical resistance, color, turbidity, volume, vapor pressure, viscosity, reactive fluorescence, etc. A calibrated digital or analog measurement is not strictly necessary, it is only important for the RFID chip 112 to be able to report any significant change in such physical characteristic of the container product 110 since being sealed. Such changes can be interpreted to indicate product tampering, spoiling, and counterfeiting.

A radio link 124 is established when the reader 102 is activated and brought close enough to the antenna 114. In general, this distance will be a few inches, and that is important to guarantee an intimate communication link not interfered with by other devices. It can therefore be important to place the antennas 114 on the tops of packages 104 if they are to be shipped together in multiple unit boxes. A reader 102 can be passed over the top of such a shipping box to interrogate each and every package 104 inside.

The portable tag reader 102 comprises an antenna 126, an RFID reader 128, a database 130, and a user display 132. Commercial devices being marketed that can be used for RFID chip 112 and RFID reader are available from Atmel Corporation (San Jose, Calif.) as RFID "transponders" and "read/write base stations". Other such devices and operating frequencies can be used. An important aspect of any device selected for use is that it have a unique serial number and that wireless access cannot occur if its antenna is damaged.

The "plastic-welding" mentioned is accomplished in original production by vulcanizing constituent monomers with heat into long-chain cross-linked polymers that respectively entangle the RFID chip 112 and antenna 114. Any attempts to remove the RFID chip 112 and antenna 114 will be easily spotted and detected, because the bonding cannot be reconstituted or effectively substituted.

The RFID chip 112 includes a unique serial number that can be read-out by the reader 102 under certain conditions. If the unique serial number cannot be read out, then the container product 110 is assumed to be tainted or counterfeit. If the unique serial number can be read, it is used to see if it matches an original product production series number maintained by the legitimate manufacturer of the product 110.

The RFID chip 112 requires that the reader 102 be close enough to induce operating power to respond in its antenna 114. Such must be properly tuned and not broken in order to capture sufficient energy to power the RFID chip 112.

The reader 102 will assist a user in determining if there has been any tampering or counterfeiting of the product 110.

As described by Atmel Corporation, radio frequency identification (RFID) involves contactless reading and writing of data into an RFID tag's nonvolatile memory through an RF signal. An RFID system typically consists of an RFID reader and an RFID tag. The reader emits an RF signal, and data is exchanged when the tag comes close to the reader signal. The Atmel RFID tags derive their operating power from the RF reader signal, so a battery or external power source is not needed. Atmel Corporation markets a line of contactless RFID integrated circuits chip IC's, micromodules, and transponders operating at 125 kHz and 13.56 MHz. For contactless smart card applications, Atmel markets a line of 13.56 MHz Secure RF Smart Card ICs based on EEPROM technology. A new CryptoRF™ family is available with low cost, secure RF memory devices that share identical cryptographic algorithms and security features. Security is provided by encrypted passwords, mutual authentication, data encryption and encrypted checksums. CryptoRF devices are available with user memories of 1–64 kilobits of EEPROM. The CryptoRF devices are compliant with the ISO/IEC 14443 Type B standards. A contactless smart card system includes an RF reader and an RF card. The reader emits an RF signal which polls for cards. Data is exchanged when the card is within the RF field of the reader antenna.

In reference to cross-linked polymers 116 and 118 (FIG. 1), polymers in general comprise repeating molecules. These repeating molecules tend to form long chains that get tangled together. For example, polyolefins (waxes), polyacrylates (acrylics), polysulfides, polyvinylchlorides (PVC), polytetrafluoroethylene (PTFE or Teflon), and polyurethanes.

Polymerization is the process of joining together the component molecules of the polymer. In the rubber industry, polymerization is known as "vulcanization". In the fiberglass industry, polymerization is referred to as the "cure".

Polymers may be realized in a variety of viscosities, such as an oil (liquid), a gum (thixotropic gel), and a rubber (solid). An oil is made of short loosely-tangled pieces of "thread", a rubber is made up of long tightly-knotted tangles of "thread". The tangling of the "threads" of a polymer is called cross-linking and the process of tangling is called polymerization. Cross-linking and polymerization are what happens when portions of the polymer chains interact with each other.

A "fully polymerized" polymer is not usually dissolved in a solvent, the tangled knots can't be untied. Breaking the polymer down into its individual component molecules loses the road-map or guide to the organization of the component parts, and cannot be put back together into the polymer.

Some polymers have tight rigid bonds with highly organized chains, like polymethacrylates (acrylics) which are hard but brittle. Other polymers have loose and flexible bonds, like silicone rubber which is resilient and elastic A particular silicone polymer may be in various physical states which is usually determined by the length of the polymer chains and the degree of cross-linking between these chains. A fluid (silicone oil) has short polymer chains with limited cross-linking between chains (short loosely tangled threads). Gums have longer polymer chains and a greater degree of cross-linking (longer and more tightly knotted chains). Rubbers have long chains that are highly organized and cross-linked.

The manufacture of conventional silicone rubber involves extensive cross-linking between chains of a polymer. As the reaction proceeds, the reactive sites on each chain react other reactive sites, forming a highly cross-linked network of polymer. Silicone rubber is made by letting this cross-linking reaction proceed until all the reactive sites are linked.

Figure 2:
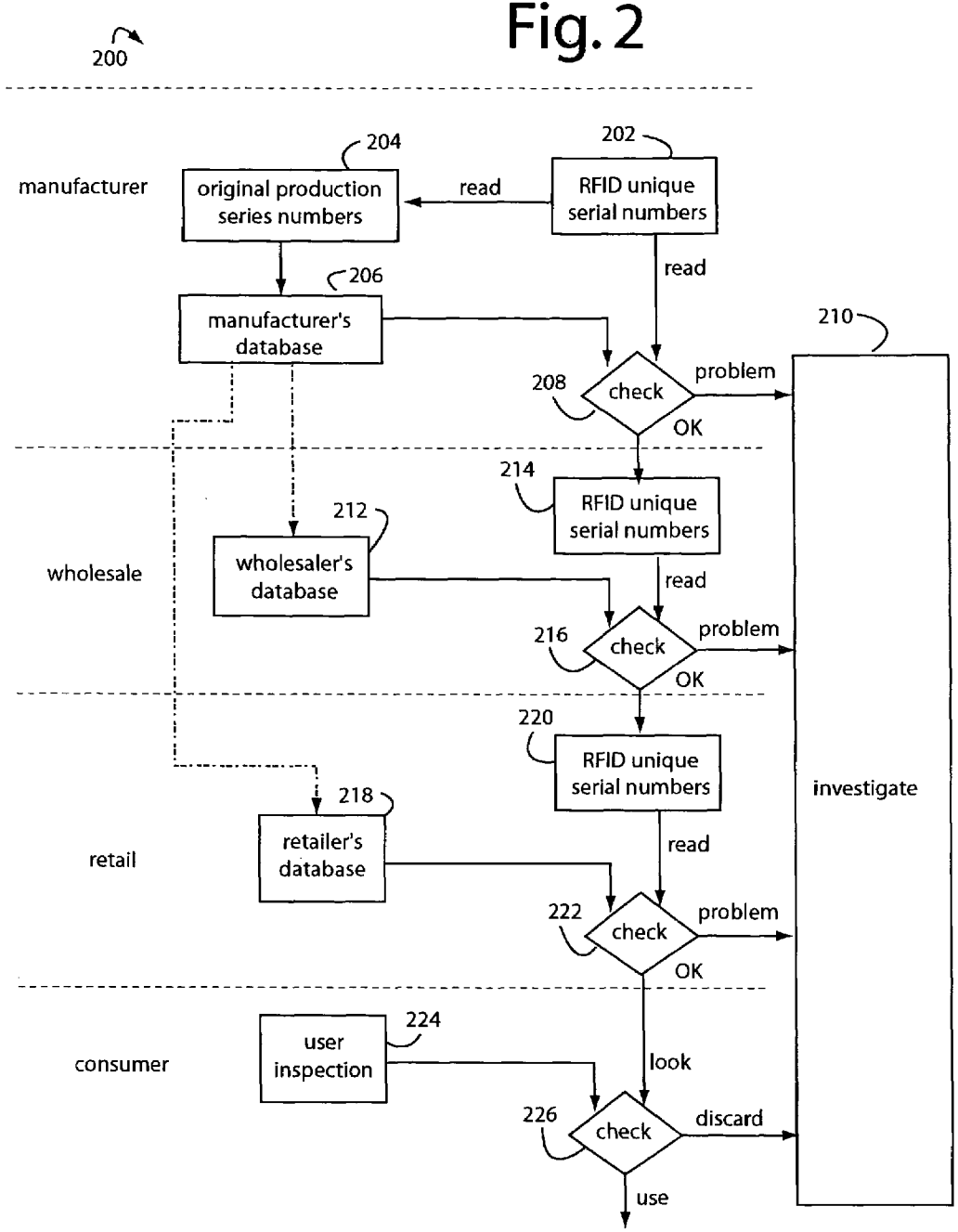
FIG. 2 is a flowchart diagram of a method embodiment of the present invention.

FIG. 2 illustrates a method embodiment of the present invention for product security, and is referred to herein by the general reference numeral 200. The method 200 comprises packaging products that have unique serial numbers that can be wirelessly interrogated, as in a step 202. A manifest 204 of original production series numbers is built from the unique product serial numbers and maintained in a manufacturer database 206. At the factory, a check 208 is made to see if the wireless reading of the product unique serial number can be done, and that it matches what is expected from the database 206. If not, a problem is detected and an investigation is made in a step 210. Otherwise, the product 214 can be shipped to the wholesale level.

At wholesale, the product 214 may not be the product 202 that the manufacturer produced, e.g., it has been counterfeited. A wholesaler's database 212 is derived by trusted channels from the manufacturer's database 206. A check of the numbers in a step 216 will detect a counterfeit product that otherwise looks perfect. If the correct numbers are returned by a reader, then the product proceeds to the retail level as a product 220.

Again, the product 220 may have been counterfeited or tampered with, and a retailer's database 218 is used in a step 222 to detect a problem. If the product numbers check, then the product is made available to the consumer level. Such retailer's database 218 can be copied from an appropriate part of wholesaler's database 212 or manufacturer database 206. The Internet can be used to securely communicate these databases.

A user inspection 224 is mostly visual, e.g., referring to FIG. 1, looking at the embedding of the tuned antenna 114 in the cross linked polymer 116 and the RFID chip 112 in cross linked polymer 118. If not intact, the consumer is advised to discard the product and investigation 210 should be conducted. Otherwise, the product is assumed to be pristine and legitimate and can be used with confidence.

Alternative embodiments of the present invention incorporate the same pieces of FIG. 1 in different ways to suit a variety of product packages. For example, plastic jars, pill bottles, aluminized pouches, blister packs, wine bottles, boxes, security badges, identification cards, passports, etc. The system 100 can be retrofitted and permanently "glued" to an existing packaging. For new package designs, the electronic components can be embedded or encapsulated in the very fabric of the packaging material.

FIG. 3A represents a security device embodiment of the present invention for a bottle or jar with a simple cap, and is referred to herein by the general reference numeral 300. In FIG. 3B, security device 300 is shown partially embedded in a cap 302 of a jar 304. A pair of tabs 306 and 307 are to be wrapped and permanently bonded to the body of the jar. An RFID chip 308 is included between tabs 306 and 307 and will separate from an antenna 310 if any stress is applied to a notch 312. During product manufacturing and packaging, the cap 302 is twisted onto jar 304 and tabs 306 and 307 are bonded to the neck of jar 304. Twisting off the cap 302 will break the antenna 310 and prevent functioning of RFID chip 308. Before any opening or tampering, the RFID chip 308 can be interrogated through antenna 310 to report its unique serial number to a wireless reader.

FIG. 4A represents another security device embodiment of the present invention for a bottle or jar with a security cap, and is referred to herein by the general reference numeral 400. In FIG. 4B, security device 400 is shown embedded between a security-cap top 402 and a break-away ring 403. The cap is screwed onto a jar 404 during product packaging and ring 403 will remain thereafter on jar 404. A bottom substrate 406 supports an RFID chip 408 and are embedded in ring 403. RFID chip 408 is electrically connected to an antenna 410 that will separate at a notched area 412 if enough stress is applied. Normally, twisting off the cap 402 will break the antenna 410 and thus prevent functioning of RFID chip 408. Before any opening or tampering, the RFID chip 408 can be interrogated through antenna 410 to report its unique serial number to a wireless reader.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the "true" spirit and scope of the invention.

What is claimed is:

1. A product security system, comprising:
    a radio frequency identification (RFID) chip with an embedded unique serial number and responsive to wireless interrogation by a reader;
    a tuned antenna connected to the RFID chip critically tuned to operate at a particular frequency and supporting said wireless interrogation; and
    polymerized constituent monomers formed into long-chain cross-linked polymers that entangle said wireless RFID chip and tuned antenna with a product container;
    wherein, any opening of said product container or removal of the wireless RFID chip and tuned antenna breaks the antenna and renders the RFID chip inoperable.

2. The system of claim 1, further comprising:
    a reader for said wireless interrogation of the RFID chip via the antenna and able to wirelessly collect said unique serial number and sense a detuning of said tuned antenna.

3. The system of claim 2, further comprising:
    a first product-packaging part to which the RFID chip is permanently attached by thermosetting cross-linked polymers which obviate attempts to remove the RFID chip;
    a second product-packaging part to which the antenna is permanently attached by thermosetting cross-linked polymers which obviate attempts to remove the antenna;
    a third product-packaging part which provides for access and that is bridged by the antenna connecting to the RFID chip; and
    a database of unique serial numbers and their associations with particular protected products originally supplied in the product container.

4. The system of claim 1, further comprising:
    a sensor for placement inside said product container, and connected to the RFID chip, and providing for a physical measurement and wireless reporting of an attribute of an originally supplied protected product within.

5. The system of claim 1, further comprising:
    a sensor placed inside the product container, and connected to the RFID chip, and providing for a measurement and wireless reporting of a change in a particular characteristic physical attribute of said product.

6. The system of claim 4, further comprising:
    a database of unique serial numbers and their associations with said physical measurement that provides for product-quality surveillance.

7. A secure product container, comprising:
    a radio frequency identification (RFID) chip with an embedded unique serial number and responsive to wireless interrogation by a reader;
    an antenna connected to the RFID chip and being critically tuned to operate at a particular frequency and supporting said wireless interrogation;
    a first product-packaging part to which the RFID chip is entangled by polymerized constituent monomers formed into long-chain cross-linked polymers and which will render obvious any attempts to physically access the RFID chip;
    a second product-packaging part to which the antenna is entangled by polymerized constituent monomers formed into long-chain cross-linked polymers and which will render obvious any attempts to physically access the antenna; and
    a third product-packaging part which provides for opening and that is bridged by the antenna connecting to the RFID chip;
    wherein, an opening of the third product-packaging part breaks the antenna and renders the RFID chip inoperable.

8. A method for delivering products to consumers, comprising:
    embedding a wireless RFID chip in a product package with a tuned antenna that will be damaged when the product package is entered;
    polymerizing constituent monomers with heat into long-chain cross-linked polymers that entangle said wireless RFID chip, product package, and tuned antenna;
    collecting a unique serial number from said RFID chip via wireless communication through said tuned antenna;
    associating said unique serial number with a particular series of production runs during manufacture into a manufacturer's database;

interrogating said unique serial number directly from a particular product package;
comparing said unique serial number obtained in the step of interrogating with data in said manufacturer's database; and
accepting the product in said product package as safe or legitimate if said step of comparing results in a match.

9. The method of claim 8, wherein:
the step of collecting will fail to report said unique serial number if said product package has been entered.

10. The method of claim 8, further comprising:
inspecting said product package for evidence of tampering with said RFID chip or tuned antenna.

11. The method of claim 8, wherein:
the step of collecting will fail to report said unique serial number if said product package has been tampered with enough to detune or ruin said tuned antenna.

12. The method of claim 8, wherein:
the step of embedding said wireless RFID chip and tuned antenna is such that attempts to physically access them after manufacturing will be visually obvious to a consumer.

13. The method of claim 8, wherein:
the step of embedding said wireless RFID chip and tuned antenna further includes placing a sensor in contact with a product enclosed by said product package.

14. The method of claim 13, further comprising:
reporting a change in a physical characteristic of said product via said RFID chip as measured by said sensor.

* * * * *